United States Patent [19]
Mielke

[11] 3,883,886
[45] May 13, 1975

[54] PHOTOGRAPHIC DIAPHRAGM AND CAMERA

[75] Inventor: Bodo Mielke, Wolfenbuttel, Germany

[73] Assignee: Rollei-Werke Franke & Heidecke, Braunschweig, Germany

[22] Filed: Apr. 2, 1974

[21] Appl. No.: 457,169

Related U.S. Application Data

[63] Continuation-in-part of Ser. No. 335,914, Feb. 26, 1973, Pat. No. 3,812,501, which is a continuation-in-part of Ser. No. 155,415, June 22, 1971, Pat. No. 3,724,350.

[30] Foreign Application Priority Data

Apr. 4, 1973 Germany............................ 2316812

[52] U.S. Cl............................... 354/271; 354/274
[51] Int. Cl............................................... G03b 9/06
[58] Field of Search ....... 354/40, 43, 270, 271, 274, 354/26, 29, 30

[56] References Cited
UNITED STATES PATENTS

| | | | |
|---|---|---|---|
| 622,592 | 4/1899 | Berger | 354/274 |
| 1,689,268 | 10/1928 | Wittel | 354/274 |
| 2,944,477 | 7/1960 | Tesch | 354/274 |
| 2,949,076 | 8/1960 | Finkel | 354/274 |
| 2,968,227 | 1/1961 | Melle | 354/29 X |
| 3,526,176 | 9/1970 | Hackenberg | 354/43 |
| 3,668,995 | 6/1972 | Bardutzky | 354/274 |

*Primary Examiner*—Joseph F. Peters, Jr.
*Attorney, Agent, or Firm*—Stonebraker, Shepard & Stephens

[57] ABSTRACT

A diaphragm having a series of regular leaves or blades which are pivoted to close down from maximum aperture to a very small aperture, plus a single special closing element which can be swung to a position obscuring the small aperture remaining when the regular leaves are closed down to the minimum aperture position. A diaphragm of this kind is particularly useful in a single lens mirror reflex camera of the kind in which the diaphragm aperture, during exposure, is set in accordance with the light falling on a photoelectric converter placed behind the lens and in which, also, there is provision for taking into account the stray light or interference light falling on the photoelectric converter, so that the diaphragm aperture set for exposure purposes is responsive only to the light from the scene to be photographed, independently of stray light or interference light.

7 Claims, 1 Drawing Figure

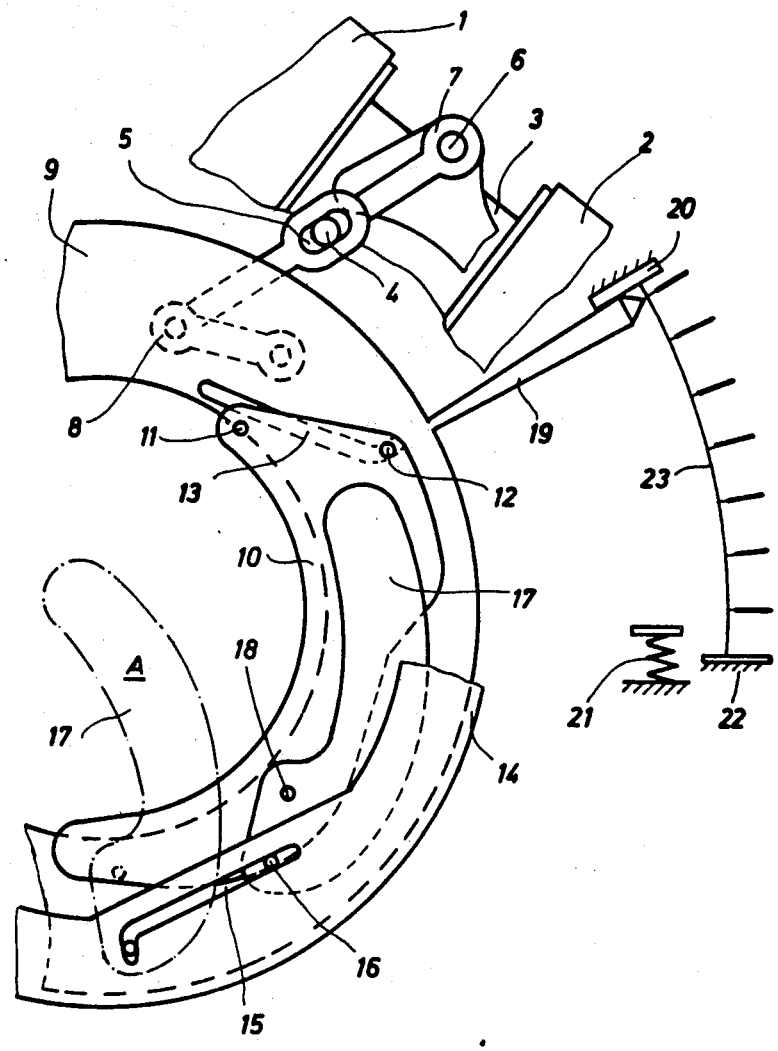

PHOTOGRAPHIC DIAPHRAGM AND CAMERA

CROSS REFERENCE TO RELATED APPLICATIONS

This application is a continuation-in-part of application Ser. No. 335,914, filed Feb. 26, 1973 (now U.S. Pat. No. 3,812,501, granted May 21, 1974), which application, in turn, is a continuation-in-part of application Ser. No. 155,415, filed June 22, 1971 (now U.S. Pat. No. 3,724,350, granted Apr. 3, 1973). Also the present application is in the nature of an improvement on the structure disclosed in Strauss U.S. Pat. No. 3,792,485, granted Feb. 12, 1974 on an application filed Mar. 21, 1973, as well as an improvement on the above mentioned two applications of which this application is a continuation-in-part.

BACKGROUND OF THE INVENTION

From the above mentioned U.S. Pat. No. 3,792,485, it is known in the art to provide a single lens mirror reflex camera with a photoelectric converter behind the lens, to measure the light coming through the lens from the subject or scene to be photographed, and it is also known to take a reading of the amount of stray light or interference light reaching the converter, and to make allowance for this stray light so that when the output of the converter determines the diaphragm aperture which should be used for making the exposure, the aperture will be correctly set only in accordance with the light from the subject or scene, without being responsive to the stray light or interference light. This stray light or interference light is light which reaches the photoelectric converter through the adjusting disk or focusing screen. When the amount of stray light reaching the photoelectric converter is to be determined, it is necessary, of course, to cut off entrance of light through the lens, in order that the converter will be subjected, for the moment, only to stray light and not to scene light. Then when the amount of stray light has been determined, light from the scene to be photographed is allowed to fall on the converter, so that the converter is now subjected to stray light plus scene light, and the known mechanism is such that the previously determined quantity of stray light is subtracted from the total of scene light plus stray light, whereby the diaphragm aperture is set only in accordance with scene light, independently of stray light.

All of this is explained in the above mentioned U.S. Pat. No. 3,792,485, and it is assumed that the reader is already familiar with this, and is likewise familiar with the patents resulting from the above mentioned applications U.S. Pat. Nos. 335,914 and 155,415, so that the disclosure in the present application can be somewhat simplified and abbreviated without having to repeat the explanations or theories disclosed in the three patents mentioned. The complete disclosure of these three patents is incorporated herein by reference.

During the determination of the amount of stray light reaching the photoelectric converter, light coming into the camera through the lens must be blocked off, as already mentioned. Normally this is done by closing the camera shutter, if the camera is equipped with an objective shutter (that is, a shutter of the kind often called a central shutter or a lens shutter) as distinguished from a focal plane shutter. However, as mentioned in U.S. Pat. No. 3,792,485, this could also be done by using a diaphragm of a kind which can be closed down completely to obstruct all passage of light. Most adjustable diaphragms such as iris diaphragms, will not do this, however. In most adjustable diaphragms, even when the leaves or blades are closed down to the minimum aperture, there is still a small opening at the center of the diaphragm, through which light may enter. Thus when the camera is equipped with such a diaphragm, the blocking of light from the scene to the photoelectric converter must be accomplished by closing an objective shutter, rather than by closing a diaphragm. Some diaphragms which will close completely are known in the art, but they are not entirely suitable and satisfactory for the purpose.

An object of the present invention, therefore, is the provision of an improved and more satisfactory diaphragm, which can be completely closed to obstruct passage of all light, and which is particularly suitable for purposes of the present invention. Such a diaphragm is particularly advantageous for two reasons. First, the camera operation can be speeded up, since the determination of stray light falling on the converter can first be made by completely closing the diaphragm, and then the diaphragm can be opened up to the proper aperture determined by the converter when light reaches it through the opened diaphragm, without allowing time for the extra steps of closing an objective shutter and then opening the objective shutter again for taking the readings of light falling on the converter. Second, with a diaphragm of this kind it is no longer necessary to have any objective shutter. If the camera designer so desires, he can use a focal plane shutter rather than an objective shutter, and the diaphragm capable of complete closing can perform all of the necessary functions of blocking light from the scene to be photographed and then allowing light from the scene to reach the photoelectric converter, in order to make the necessary determinations regarding stray light and scene light.

BRIEF DESCRIPTION OF THE DRAWING

The single view of the drawing is a schematic representation of a fragment of a diaphragm according to the present invention, showing enough of the diaphragm mechanism to enable an understanding of the invention.

DESCRIPTION OF THE PREFERRED EMBODIMENT

The camera includes two pot-shaped magnets 1 and 2, and a moving coil 3. These magnets are of the kind described in the above mentioned U.S. Pat. No. 3,724,350, with a narrow gap at the end of each magnet, the coil moving back and forth between the two magnets with part of the coil in each magent at all times. As described in the magnet the coil is so arranged that substantially the same number of turns of the coil are in the narrow gap at the end of the magnet, in all positions of the coil, so that a given amount of current flowing through the coil produces substantially the same amount of endwise thrust in the coil, relative to the stationary magnets, regardless of the axial position of the coil.

A pin 4 on the coil engages in a slot 5 of a transmission lever 7 swinging on a fixed pivot 6. Thereby the axial movements of the coil, resulting from the flow of current through the turns of the coil, is transmitted to the lever 7, and transmitted from the lever through a link 8 to a diaphragm driving ring 9. The diaphragm has the usual plurality of leaves or blades or sectors 10, only one of which is shown for the sake of clarity. Each blade is pivoted on a fixed pivot 11, and has a pin 12 engaged in a slot 13 in the driving ring 9.

The parts are so arranged that when the driving ring 9 is in its counterclockwise limit position, the shutter leaves 10 will be fully open at maximum aperture, this being the position illustrated in the drawing. At this time, the coil 3 is in its extreme leftward limit position, as far as it can go into the magnet 1, and extends barely into the magnet 2. Upon flow of current in the proper direction in the turns of the coil, the coil 3 moves rightwardly, partly out of the magnet 1 and farther into the magnet 2, and this motion is transmitted, through the lever 7 and link 8, to the diaphragm driving ring 9, turning this ring clockwise so that the inclined slots 13 act on the pins 12 of the diaphragm leaves 10, and swing the diaphragm leaves inwardly on their fixed pviots 11, to a smaller aperture.

The manner in which the diaphragm leaves 10 overlap with each other is such that at the smallest aperture, there is still a small opening at the center, through which light could enter if special provision were not made for closing this opening. The present invention therefore provides a fixed ring 14 which may be referred to as a ring mask, having a slot 15 therein. A closing element in the form of a segment or blade 17 is pivotally mounted on the driving ring 9 by a pivot 18, and carries another pin 16 engaged in the slot 15.

This slot 15 is, in effect, a cam slot acting on the pin 16. During most of the rotary movement of the ring 9, the segmental closing element 17 lies completely outside of the aperture determined by the position of the regular diaphragm leaves 10. The cam slot 15 is so shaped that just as the driving ring 9 reaches the clockwise limit of its motion, swinging the leaves 10 to minimum aperture position, the element 17 is suddenly swung inwardly on its pivot 18, from the full line position outside the aperture to the dot-dash line position indicated at A, extending approximately radially inwardly so that the free end of the element 17 covers the small aperture remaining between the leaves 10 when they are at their minimum aperture position. In this way, the element 17 closes the small opening at the center of the regular or main diaphragm leaves 10, when they are at minimum aperture position, and is swung outwardly to a non-interferring position as soon as the regular leaves 10 begin to open up from their minimum aperture position.

The driving ring 9 carries an extension 19 which constitutes an indicator and also an abutment member. In the maximum aperture position or counterclockwise limit position of the ring 9, the member 19 comes to rest against a fixed stop 20. In a position slightly beyond the minimum diaphragm aperture position, it comes to rest against a fixed stop 22, after first overcoming the force of a spring mounted stop 21. A diaphragm aperture scale 23, conventionally marked with the usual *f* stop numerals, cooperates with the pointed end of the member 19, to show the operator the *f* value of the aperture at any given moment.

The circuit connections of the coil 3 are situated in the equalizing branch of a balancing bridge circuit such as described in the above mentioned application U.S. Pat. No. 335,914, of which the present application is a continuation-in-part. In this way the coil can be moved to any desired position along its path of adjustment, as a result of which any desired diaphragm value can be selected between the limits of maximum and minimum diaphragm aperture for which the particular diaphragm is designed.

The method of operation of the present invention will be described below in greater detail, by reference to the cycle of movements of an exposure process.

The camera is preferably provided with an exposure measuring key which, when pressed by the operator, closes a switch to operate the circuitry to determine the diaphragm aperture required by prevailing light conditions, in view of the shutter speed which has been set and the speed or sensitivity of the film being used in the camera, but without necessarily resulting in an exposure at this time. In other words, the pressing of this key enables the photographer to determine the automatically set diaphragm aperture, for prevailing conditions, and he can then decide whether he wants to take the picture at that sperture, or whether he wants to change the shutter speed in order to enable use of a larger or smaller diaphragm aperture. When he is satisfied with the aperture, he can then proceed to make the exposure, by appropriate manipulation of the camera; for example, by further pressing the same key which, when pressed only partially, causes and indication of the aperture setting, or by pressing a separate key or plunger. The details of this are not important for purposes of the present invention.

When the exposure measuring key or plunger has been pressed to the proper extent, the "diaphragm closing" part of the program is first initiated. In this part, the coil 3 is energized, moving the coil rightwardly to its limit position, as far as posssible into the pot-shaped magnet 2 and as far as possible out of the pot-shaped magnet 1, under the influence of the electromagnetic forces. The pin 4 fixed to the coil transmits the coil movement through the lever 7 and crank rod or link 8 to the diaphragm driving ring 9, causing it to rotate clockwise. The pins 12 of the regular diaphragm leaves 10 thus move along the cam slots 13 in the ring, as a result of which the diaphragm leaves perform pivoting movement about their respective fulcrum pivots 11, in a direction toward the center of the diaphragm. This rotary movement of the driving ring 9 is brought to a stop, after overcoming the force of the spring mounted stop 21, by the fixed stop 22, even if current is still flowing through the turns of the coil 3, so that no current equalizing process has taken place. In this process, the diaphragm leaves reach the minimum possible diaphragm aperture.

In cases in which current equalization has taken place so that the current ceases to flow through the coil 3, the spring mounted stop 21 serves to thrust the indicator 19 and thus the driving ring 9 back into the position corresponding to the minimum possible diaphragm aperture, when a diaphragm aperture has been selected which is slightly below the minimum possible aperture. As a result, the electrical bridge is compensated, the coil once again carrying current and the diaphragm once again closing, so that the cycle of movements is repeated. In these cases a signal can thus be derived which indicates that the operation which has taken place is a diaphragm closure and not a diaphragm adjustment.

With the rotation of the diaphragm driving ring 9, the pin 16 attached to the closing element 17 is at the same time moved toward the left, as shown in the drawing, in the cam slot guide 15 of the ring mask 14. At the moment when the diaphragm leaves or blades 10 form the minimum possible diaphragm aperture, the pin 16 drops into the bent part of the cam slot 15, as a result of which the closing element 17 performs a sudden pivoting movement about the fulcrum 18, in such manner as to cover the remaining small diaphragm aperture, this being the position shown at A by dot-dash lines.

The interference light or stray light entering through the viewfinder or focusing screen is now measured, as described in the above mentioned U.S. Pat. No. 3,792,485, by the photoelectric converter, the voltage caused in the latter by the stray light being stored up as a threshold value. The diaphragm is then reopened by the reversal of the moving coil drive, so that the coil moves into the pot-shaped magnet 1 and out of the pot-shaped magnet 2 until it becomes currentless as a result of the electrical bridge equalization taking place. It is held in this position by the frictional forces prevailing in the diaphragm adjusting mechanism. In this movement of the coil 3, the driving ring 9 is rotated counter-clockwise. The closing element 17 moves out of the diaphragm aperture, and the diaphragm blades set a diaphragm aperture in accordance with the value which has been measured by the exposure regulator, compensated for stray light or interference light as already explained. The exposure measuring operation is thus completed. The process can now be followed by an exposure if the photographer is satisfied with the diaphragm setting, or the measuring process can be repeated without exposure at this time, if desired.

Owing to the low energy required for operating the present construction in order to make a measurement of diaphragm aperture appropriate to the prevailing light conditions, the present system enables a number of exposure verifications to be carried out prior to making the exposure, without excessive use of energy (drain on the battery) as would be likely to occur if the shutter had to be closed and opened each time an exposure varification is carried out.

In addition to saving energy, because the diaphragm can be operated with less energy than required for the shutter, the present construction of a diaphragm which can be completely closed is particularly suitable for use in a camera of the kind in which stray or interference light is to be measured, because of the saving in time as already mentioned above. Moreover, the present diaphragm has the advantage that it is economical to build, because many of the parts, if desired, can be standard parts of conventional diaphragms, economically made by using the tools and dies already in use for such conventional diaphragms, needing only the addition of the simple closing element 17 and its operating cam slot 15 to a diaphragm which is otherwise conventional.

What is claimed is:

1. A photographic diaphragm comprising a series of diaphragm leaves 10 pivoted for swinging movement from maximum aperture position to minimum aperture position, there being a small central opening for passage of light when said leaves are in minimum aperture position, a pivoted closing element 17 separate from said diaphragm leaves for obstructing passage of light through said small central opening so that said diaphragm may be used to prevent entrance of all light through the lens of a camera on which said diaphragm is mounted while taking a reading of stray light entering the camera elsewhere, adjusting mechanism for adjusting the position of said diaphragm leaves 10, said closing element 17 being coupled to said adjusting mechanism to be moved thereby, a fixed ring, and a cam slot 15 in said fixed ring, said adjusting mechanism including a driving ring 9, said closing element 17 being pivotally mounted on said driving ring 9 and having a control pin 16 engaged in said cam slot 15.

2. The invention as defined in claim 1, wherein said cam slot 15 is so shaped that said closing element 17 is kept in a position outside of the aperture formed by said diaphragm leaves 10 when they are in their maximum aperture position, during movement of said driving ring 9 from maximum aperture position to minimum aperture position, and then when said driving ring 9 moves further beyond minimum aperture position said closing element 17 moves suddenly to a position covering said small central opening.

3. The invention as defined in claim 1, wherein said adjusting mechanism further includes a stationary pot-shaped magnet having a narrow air gap portion at one end, an axially movable coil having a multiplicity of turns movable through said air gap portion, substantially the same number of turns of said coil being within said narrow air gap portion in all axial positions of said coil, and coupling means coupling said coil to said driving ring so that when said coil moves axially in response to flow of current through said coil, it will cause movement of said driving ring.

4. The invention as defined in claim 3, wherein said coupling means includes a lever 7 mounted to swing on a fixed pivot 6, a slot 5 in said lever, a pin 4 on said coil engaging in said slot 5 to cause said lever to swing when said coil moves axially, and a link 8 coupling said lever to said driving ring 9.

5. The invention as defined in claim 1, wherein said cam slot 15 is so shaped that said closing element 17 is kept in a position outside of the aperture formed by said diaphragm leaves 10 while said driving ring 9 moves from maximum aperture position to minimum aperture position and then when said driving ring moves further beyond minimum aperture position said closing element moves suddenly to a position covering said small central opening.

6. The invention as defined in claim 5, further comprising spring means opposing further movement of said driving ring beyong said minimum aperture position.

7. The invention as defined in claim 5, further comprising an abutment member 19 operatively connected to said driving ring 9 to move therewith, and a spring mounted stop member 21 in a position to be engaged by said abutment member when said driving ring reaches said minimum aperture position, further movement of said driving ring beyond said minimum aperture position being accompanied by displacement of said spring mounted stop member.

* * * * *